United States Patent [19]

Brannon et al.

[11] Patent Number: 5,562,160
[45] Date of Patent: Oct. 8, 1996

[54] FRACTURING FLUID TREATMENT DESIGN TO OPTIMIZE FLUID RHEOLOGY AND PROPPANT PACK CONDUCTIVITY

[75] Inventors: Harold D. Brannon, Spring; Robert M. Tjon-Joe-Pin, Houston, both of Tex.

[73] Assignee: B. J. Services Company, Tomball, Tex.

[21] Appl. No.: 544,572

[22] Filed: Oct. 18, 1995

Related U.S. Application Data

[63] Continuation of Ser. No. 287,444, Aug. 8, 1994, abandoned.

[51] Int. Cl.$^6$ .......................... E21B 49/00; E21B 43/267
[52] U.S. Cl. ..................... 166/250.1; 166/280; 166/300; 166/308
[58] Field of Search ................. 166/290.1, 280, 166/300, 308; 507/201, 921, 924

[56] References Cited

U.S. PATENT DOCUMENTS

| | | | |
|---|---|---|---|
| 4,502,967 | 3/1985 | Conway | 166/308 X |
| 5,067,566 | 11/1991 | Dawson | 166/308 |
| 5,103,905 | 4/1992 | Brannon et al. | 166/250 |
| 5,165,477 | 11/1992 | Shell et al. | 166/291 |
| 5,201,370 | 4/1993 | Tjon-Joe-Pin | 166/300 |
| 5,226,479 | 7/1993 | Gupta et al. | 166/300 |
| 5,441,109 | 8/1995 | Gupta et al. | 166/300 |

FOREIGN PATENT DOCUMENTS

WO91/18974  12/1991  WIPO.

OTHER PUBLICATIONS

Bacteria That Flourish Above 100° C. Could Benefit Industrial Processing, *Chemical and Engineering News*, Nov. 4, 1991, 69:31–34.

Enzymes From High–Temperature Microorganisms, *Current Opinion in Biotechnology*, 1993, 4:188–192.

*Primary Examiner*—George A. Suchfield
*Attorney, Agent, or Firm*—Arnold, White & Durkee

[57] ABSTRACT

A method of fracturing a subterranean formation in a well bore is shown in which a gellable fracturing fluid is first formed by blending together an aqueous fluid, a hydratable polymer, a suitable cross-linking agent for cross-linking the hydratable polymer to form a polymer gel and an enzyme breaker. The cross-linked polymer gel is pumped into the well bore under sufficient pressure to fracture the surrounding formation. The enzyme breaker is allowed to degrade the cross-linked polymer with time to reduce the viscosity of the fluid so that the fluid can be pumped from the formation back to the well surface. The particular enzyme breaker utilized has an activity in the temperature range from about 60°–300° F. and at a pH range from about 2.0 to 11.0 and is effective to attack only specific linkages in the cross-linked polymer gel.

8 Claims, 4 Drawing Sheets

Figure 3
Break Profile GLSE 50:1 (250 F at 8 hrs.)
Medallion Frac 4000 HT

Figure 4
Break Profile GLSE 50:1 (250 F at 24 hrs.)
Medallion Frac 4000 HT

FRACTURING FLUID TREATMENT DESIGN TO OPTIMIZE FLUID RHEOLOGY AND PROPPANT PACK CONDUCTIVITY

This is a continuation of application Ser. No. 08/287,444, filed Aug. 8, 1994 now abandoned.

BACKGROUND OF THE INVENTION

1. Field of the Invention

The present invention relates to gelled fracturing fluids of the type used in well bore operations and particularly to a method for producing a gradual reduction in the viscosity of a gelled fracturing fluid through the use of enzymes incorporated in the gelled fluid which are active over broad pH and temperature ranges.

2. Description of the Prior Art

During hydraulic fracturing, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such as a suitable polysaccharide. The gelled fluid can be accompanied by a propping agent which results in placement of the propping agent within the fracture thus produced. The proppant remains in the produced fracture to prevent the complete closure of the fracture and to form a conductive channel extending from the well bore into the formation being treated once the fracturing fluid is recovered.

The recovery of the fracturing fluid is accomplished by reducing the viscosity of the fluid to a low value such that it flows naturally from the formation under the influence of formation fluids and pressure. This viscosity reduction or conversion is referred to as "breaking" and can be accomplished by incorporating chemical agents, referred to as breakers, into the initial gel.

Historically, the application of breakers in fracturing fluids at elevated temperatures, i.e., above about 170–190 degrees F., has been a compromise between maintaining proppant transport and achieving the desired fracture conductivity. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release.

Enzymes, from a theoretical perspective, are known to provide superior performance relative to oxidative breakers. This is due to the inherent specificity and the infinite polymer degrading activity of enzymes. However, the application of enzymes has historically been limited to low-temperature fracturing treatments due to the perceived pH and temperature constraints of these breaker systems.

The application of effective enzyme breaker technology to high temperature fracturing treatments should result in improved well productivity relative to treatments utilizing conventional breaker technology. One area of particular improvement should be in reducing polymeric damage caused by polymeric filter cake buildup or unbroken gel residue. A polymeric filter cake is a dense mass of polymer deposited on the formation face by dynamic fluid loss while pumping and/or concentrated within the proppant-pack by fracture width reduction upon fracture closure. The polymers used as gelling agents in fracturing treatments are too large to penetrate the rock matrix and are, therefore, concentrated within the fracture. Several studies have documented that the polymer concentration within the fracture is as much as 20-fold the surface gelling agent concentration.

Polymeric damage in the form of unbroken gel residue or dynamically formed filter cake can significantly reduce well productivity. For example, gel residue damage can be characterized as the blocking of pore throats by unbroken viscous gel having limited mobility or, by insoluble polymer fragments. The degree of damage is proportional to the amount of fracture pore volume occupied by the gel residue. The use of enzyme breakers allows the degradation of the polymeric gelling agents in the fluid to proceed in controllable manner to reduce the fracturing fluid viscosity by cleavage of the polymer backbone into fragments which will remain soluble in the aqueous base fluid. The advantageous use of enzyme breakers in high temperature applications would reduce polymeric damage through minimization of the amount of gel residue remaining in the fracture after load recovery.

In addition to the importance of providing a breaking mechanism for the gelled fluid to facilitate recovery of the fluid and to optimize fracture conductivity by minimizing polymeric damage, the timing of the break is also of great importance. Gels which break prematurely can cause suspended proppant material to settle out of the gel before being introduced a sufficient distance into the produced fracture. Premature breaking can also result in a premature reduction in the fluid viscosity resulting in a less than desirable fracture length in the fracture being created.

On the other hand, gelled fluids which break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured.

Optimally, the fracturing gel will begin to break when the pumping operations are concluded. For practical purposes, the gel should be completely broken within a specific period of time after completion of the fracturing period. At higher temperatures, for example, about 24 hours is sufficient. A completely broken gel will be taken to mean one that can be flushed from the formation by the flowing formation fluids or that can be recovered by a swabbing operation. In the laboratory setting, a completely broken, non-crosslinked gel is one whose viscosity is either about 10 centipoises or less as measured on a Model 50 Fann viscometer R1/B1 at 300 rpm or less than 100 centipoises by Brookfield viscometer spindle #1 at 0.3 rpm.

Obtaining controlled breaks using various prior art chemical agents, both oxidants and enzymes, has proved difficult. Common oxidants do not break the polysaccharide backbone into monosaccharide units. The breaks are nonspecific, creating a mixture of macromolecules. Further, common oxidants are difficult to control. They react with things other than the polymeric gel. Oxidants can react, for example, with the tubing and linings used in the oil industry as well as resins on resin coated proppants.

Using enzymes for controlled breaks circumvents the above noted oxidant problems. Conventional enzyme breaker systems generally degrade the gel polymers inadequately, however. These enzymes, for example, the cellulases, hemi-cellulases, amylases, pectinases, and their mixtures are familiar to those in the well service industry. These enzymes break the bonds that connect the monosaccharides into a polysaccharide backbone, for instance, the 1,4-α-D-galactosiduronic linkages in pectin. These conventional enzyme breaker systems are nonspecific and cause random breaks. As a result, these prior art enzyme systems only partially degrade the polysaccharide polymer. Instead of fragmenting almost completely into much smaller fragments such as monosaccharides, the enzymes break the polysaccharide gel into larger fragments consisting of a mixture of disaccharides, oligosaccharides and polysaccharides. These larger gel fragments have been shown to cause residue problems in the fractured formation once the fracturing operation is complete. Such residue decreases productivity by restricting the flow of fluid and plugging the formation.

The present invention has as its object to provide a break mechanism for a gelled fracturing fluid which yields high initial viscosity with little change during pumping but which produces a rapid break in the gel after pumping is completed to allow immediate recovery of the fluid from the formation.

Another object of the invention is to provide a gel system for a well fracturing operation which can break the gel polymers within a wide range of pH and temperature without interfering with the crosslinking chemistry.

Another object of the invention is to provide an enzyme breaker system for a gelled fracturing fluid which produces a controlled break over pH range from about 3 to 11 and at temperatures in the range from about 60 to 300 degrees F., or more, and which decreases the amount and size of residue left in the formation after recovery of the fluid from the formation.

Another object of the invention is to provide a thermo-stable, polymer linkage specific enzyme breaker which is catalytically active and temperature stable in the range from about 60 to 300 degrees F. and at pH's between about 3.0 to 11.0 and which decreases the amount of residue left in the formation after recovery of the fluid from the formation.

SUMMARY OF THE INVENTION

In the method of the invention, a gellable fracturing fluid is formulated by blending together an aqueous fluid, a hydratable polymer, which is capable of forming a polymer gel and an enzyme breaker which is effective to degrade the polymer gel at temperatures between about 60 to 300 degrees F. and at pH's between about 3.0 to 11.0.

Preferably, the gellable fracturing fluid is formulated by blending together an aqueous fluid, a hydratable polymer, a crosslinking agent for crosslinking the hydratable polymer and an enzyme breaker. The fluid is then pumped to a desired location within the well bore under sufficient pressure to fracture the surrounding subterranean formation. Thereafter, the enzyme breaker degrades the polymer, whereby the fluid can be pumped from the subterranean formation to the well surface. The enzyme breaker has activity in the pH range of about 3.0 to 11.0 and is effective to attack only specific linkages in the cross-linked polymer gel.

In a particularly preferred method for practicing the invention, the gellable fracturing fluid is formulated by blending together an aqueous fluid, a hydratable guar polymer having repeating units of mannose and galactose, a suitable crosslinking agent for crosslinking the hydratable polymer to form a polymer gel and an enzyme breaker. The enzyme breaker is a thermo-stable, polymer linkage specific enzyme which is catalytically active and temperature stable in the range from about 60 to 300 degrees F. and at pH's between about 3.0 to 11.0. Most preferably, the guar polymer has repeating units of mannose and galactose linked by 1,4-β-D mannosidic and 1,6-α-D galactomannosidic linkages, and wherein the thermo-stable, guar linkage specific enzyme breaker is effective to attack the 1,4-β-D mannosidic and 1,6-α-D galactomannosidic linkages.

In one embodiment of the invention, a method of reducing the viscosity of a gellable fracturing fluid is shown wherein the fluid is formulated to contain a proppant, a hydratable polymer, a suitable crosslinking agent for crosslinking the hydratable polymer to form a polymer gel and an enzyme breaker. A minimum viscosity is first determined for the fracturing fluid necessary to maintain the proppant in suspension in the gelled fracturing fluid during an elapsed pumping time. A predetermined amount of enzyme breaker is incorporated into the fracturing fluid to attain a desired break viscosity at the end of the elapsed pumping time while maintaining the minimum viscosity to maintain the proppant in suspension in the fluid during pumping. The crosslinked polymer gel containing the enzyme breaker is pumped to a desired location within the well bore to form at least one fracture within a surrounding subterranean formation. The proppant and polymer are deposited in the fracture. The enzyme breaker is a thermo-stable polymer linkage specific enzyme which is catalytically active and temperature stable in the range from about 60 to 300 degrees F. and at a pH range from 3 to 11 and the predetermined amount of enzyme breaker which is incorporated into the fracturing fluid is calculated from a mathematical model of viscosity versus concentration of enzyme at a given time and temperature and which includes pressure as one variable of the model. The predetermined amount of thermo-stable enzyme breaker which is included within the fluid can also be based upon a desired delay time for initiating the break.

Additional objects, features and advantages will be apparent in the written description that follows.

DETAILED DESCRIPTION OF THE INVENTION

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time which is sufficient to form a hydrated solution. The hydratable polymer useful in the present invention can be any polysaccharide capable of gelling in the presence of a crosslinking agent to form a gelled base fluid. Such polysaccharides include guar, derivitized guars, celluloses, particularly derivitized celluloses and biopolymers such as xanthan. Specific examples include guar gum, guar gum derivitive, locust bean gum, caraya gum, xanthan gum and cellulose derivitives. Preferred gelling agents are guar gum, hydroxypropyl guar, carboxymethyl hydroxypropyl guar, carboxymethyl cellulose, carboxymethyl hydroxyethyl cellulose and hydroxyethyl cellulose. The most preferred gelling agents for purposes of the present invention are guar gum, carboxymethyl hydroxypropyl guar and hydroxypropyl guar. These polysaccharides are hydratable polysaccharides generally having galactose or mannose monosaccharide components and are familiar to those in the well service industry.

The structure of guar consists of a linear chain of D-mannose residues (the backbone) bonded together by 1,4-β-glycosidic linkages with D-galactosyl substituents attached to the mannose chain through 1,6-α-glycosidic linkages. The galactosyl substituents are randomly arranged along the backbone. The ratio of the galactose and mannose units is about 1:2. The average molecular weight of guar is approximately 1,500,000, and the average molecule of guar polymer contains an average 3,700 repeating units.

The hydratable polymer is added to the aqueous fluid in varying ranges, depending in part upon the particular polymer selected. For example, in the case of guar and derivitized guars, the hydratable polymer is added to the aqueous fluid in concentrations ranging from about 0.12% to 0.96% by weight of the aqueous fluid. In the case of derivitized celluloses, the polymer can be added to the aqueous fluid in amounts ranging up to about 1.2% by weight, or more. In the case of the preferred guar polymers used in practicing the present invention, the preferred range is about 0.3% to about 0.72% by weight.

In addition to the hydratable polymer, the fracturing fluids of the invention include a crosslinking agent. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitinates. See, for instance, U.S. Pat. No. 4,514,309. Recent research indicates that guar gels, which are crosslinked by the additions of borate ion donating materials, often clean up faster and yield higher sand pack permeability than guar gels crosslinked with other crosslinking agents. As a result, the borate crosslinking agents are often preferred.

In the case of the borate crosslinkers, the crosslinking agent is any material which supplies borate ions in solution. Thus the crosslinking agent can be any convenient source of borate ions, for instance the alkali metal and the alkaline earth metal borates and boric acid. A preferred crosslinking additive is sodium borate decahydrate. This crosslinking additive is preferably present in the range from about 0.024% to in excess of 0.18% by weight of the aqueous fluid. Preferably, the concentration of crosslinking agent is in the range from about 0.024% to about 0.09% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants, and the like.

In a typical fracturing operation, the fracturing fluid of the invention is pumped at a rate sufficient to initiate and propagate a fracture in the formation and to place propping agents into the fracture. A typical fracturing treatment would be conducted by hydrating a 0.24% to 0.72% (weight/volume [w/v]) galactomannan based polymer, such as guar, in a 2% (w/v) KCl solution at a pH ranging from about 6.5 to 8. During the actual pumping the pH may be adjusted by the addition of a buffer, followed by the addition of the enzyme breaker, crosslinking agent, proppant and other additives if required.

The preferred breakers included in the fracturing fluids of the invention are thermo-stable, polymer linkage specific enzyme breakers. In order to understand the nature of the enzyme breakers of the invention, it is necessary to consider the unique action of the enzymes in question upon a target substrate, in this case, the gelled guar polymer.

Enzymes are large, highly specialized proteins produced by living cells. They consist of long chains of amino acids held together by peptide bonds. Present in all biological systems, enzymes are non-toxic and can be readily broken down or absorbed back into the environment and are therefore, regarded as environmentally friendly.

Enzymes exhibit a unique ability when acting as catalysts to accelerate chemical reactions. The catalytic activity does not change the enzyme structure during the reaction initiation and thus, the enzyme may then initiate another reaction, and so on. This unique feature is characterized by a property called "turnover number." For instance, one of the enzymes evaluated for use in the present invention has a turnover number of 69,000. This means that one unit of enzyme could, under ideal conditions, turn over or cleave 69,000 linkages of substrate per minute. A great many more linkages can be cleaved during the "active life" of the enzyme.

The initiation of reactions by enzymes is governed by a property known as the "lock and key principle". This principle states that each particular enzyme has an active site with a 3-dimensional configuration which is specifically complimentary to the substrate site upon which it is reactive. If the shape of the substrate is not perfectly complimentary to that of the active site, no binding can occur and thus, the reaction will not proceed. The "enzyme key" must fit the "substrate lock" to affect reaction. Therefore, enzymes are very specifically limited in reactivity to only those specific substrate sites to which they can match.

Enzymes, from a theoretical perspective, are known to provide superior performance relative to oxidative breakers in degrading a gelled fracturing fluid. This is due to the inherent specificity and the "infinite" polymer-degrading activity of enzymes. However, the application of enzymes has historically been limited to low-temperature fracturing treatments due to perceived pH and temperature constraints. Also, as has been mentioned, the enzymes which have previously been utilized in fracturing applications were non-isolated, non-purified mixtures of various hemicellulase, cellulase, pectinase, and amylase enzymes complexes. Although very similar, the various component enzymes are respectively specific to digest hemicellulose, cellulose, pectin, and starch-based polymers. The non-guar specific enzymes do not cleave the linkages of the guar polymer, since the active sites of these enzymes do not align with the cleavage sites of the polymer. However, they will attach to the guar polymer since the binding sites of guar are common to each of the enzymes. Once bound, the non-specific enzymes cannot detach from the polymers to which they are bound since the cleavage sites have not been broken. This phenomena, known as irreversible inhibition, results in polymeric fragments which are generally the molecular weight of the attached enzyme combined with the molecular weight of the polymer strand to which it is attached, effectively doubling the molecular weight of that polymer fragment.

In order to effectively degrade the gelled polymer, it is necessary to design a polymer linkage specific enzyme system. Determination of the most effective approach for degradation should focus on identifying the structural linchpins within the polymeric construction. This is analogous to identifying the most appropriate nuts and bolts to extract for effective dismantling of a structural framework. Removing the linchpins, or breaking the appropriate linkages in this case, will result in collapse of the structure into manageable components. The manageable components in this instance, are non-damaging simple sugar units.

The structure of guar may be most simply defined as a polymer which is a repeating series of mono and disaccharide units. The most effective approach to engineer a structural dismantling of a guar polymer is to concentrate the attack upon the $\beta$-1,4 linkage between the mannose units and the $\alpha$-1,6 linkage between the galactose and mannose. Successful cleavage of these linkages will reduce the polymer to simple monosaccharide sugars which are completely soluble in water. There are no other reactive sites within the polymer structure which will result in any significant molecular weight reduction.

A polymer-specific enzyme is defined as an enzyme which will align and react with only that particular polymer. The term polymer-specific enzyme does not necessarily equate to effective degradation of the polymer to simple sugar units, however. Many different enzymes exist which are specific for only guar polymer, but do not effectively reduce the polymer to simple sugars or reduce molecular weight. The enzyme must be not only polymer-specific to match up with the polymer, but also additionally, it must be polymer linkage-specific to attack the appropriate linkages to affect the desired degradation.

While the guar polymer is comprised of a mannose backbone with galactose substituents, the mannose backbone is completely insoluble when dissociated from the galactose substituents. The residual polymannan, with molecular weight of about that of cellulose, once insolubilized cannot be degraded and thus, becomes irreversible polymeric damage. The application of a complex containing "random hydrolysis" enzymes, or endo-enzymes, can result in the occurrence of this undesirable behavior. For example, an endo-enzyme, such as $\alpha$-galactose dehydrogenase, can degrade the $\alpha$-1,6 linkages between the galactose and the mannose units at any point along the polymer strand to cleave the galactose from the polymannan backbone.

In order to accomplish effective structural dismantling of guar polymer resulting in soluble simple sugar residues, the guar-specific enzyme complex must be singularly specific to the $\beta$-1,4 linkage between the mannose units and the $\alpha$-1,6 linkage between the galactose and mannose. The most preferred guar-specific enzymes to attack the identified linkages are hydrolases, which initiate the reaction of hydrolysis by cleaving specific linkages within the polymer to yield predominantly mono and disaccharides.

The most effective pathway would be the cleavage of the $\beta$-1,4 linkages between the mannose units prior to cleavage of the $\alpha$-1,6 linkages between the galactose and the mannose unit. Galactomannans are most efficiently hydrolyzed by a specific galactomannan enzyme complex which is a combination of two O-glycosidic hydrolases. The first O-glycosidic hydrolase, mannan endo-1,4-$\beta$-mannosidase, is specific for the mannose backbone, randomly hydrolyses the 1,4-$\beta$-D-mannosidic linkages. The second O-glycosidic hydrolase used to degrade the guar molecule, $\alpha$-1,6-galactosidase, is specific for the galactose substituent, hydrolyzing only the terminal, non-reducing $\alpha$-D-galactoside. In other words, this particular enzyme can cleave only galactose substituents from the end of the polymer chain. Therefore, the insolubilization of polymannan residues is an unlikely occurrence utilizing this enzyme.

A particularly advantageous feature of polymer-specific enzymes with respect to fracturing applications is that upon introduction to the aqueous polymer solution, the enzyme will seek to attach to a strand of polymer. The enzyme will then piggy-back on that polymer strand until such time as it can completely degrade the polymer. The enzyme will ride to where ever the polymer travels; i.e., within the primary fracture, into natural fractures, or into high permeability matrices. Thus, the enzyme degradant will be distributed and concentrated homogeneously with the polymer throughout the fracture.

Recent advances in biotechnology led to the isolation, purification, and fermentation of guar linkage-specific (GLS) enzymes on a commercial scale. Laboratory evaluations demonstrated that the reaction rate of the enzymes could be controlled by the additive concentration, thus allowing the necessary control of break time. However, the extent of polymer degradation was observed to be independent of the GLS-enzyme concentration. It was shown that differing enzyme concentrations provided for varying break times but, the tests with each GLS-enzyme concentration were found to yield almost the same retained proppant-pack permeability.

The guar linkage-specific enzymes were first introduced for low-temperature, high pH fracturing applications (60°–140° F., pH 3–11) to provide improved cleanup of borate crosslinked fluids. See U.S. Pat. No. 5,201,370, issued Apr. 13, 1993, entitled "Enzyme Breaker For Galactomannan Based Fracturing Fluid", the disclosure of which is incorporated herein by reference. The GLS enzymes have subsequently experienced wide spread utilization within such application. The effectiveness of the GLS enzymes in low-temperature field applications has been highlighted in previously published case histories. One particular case history was conducted on San Andres wells in Lea County, N.M. In five sections, 25 wells fractured with fluids containing GLS enzyme breakers were compared to 30 offset wells fractured with fluids containing oxidative breakers. The bottom hole static temperatures were approximately 100° F. An aggregate average 250% increase in the 6-month normalized production was observed for the wells treated with fluids incorporating the GLS enzyme.

In order to extend the advantage of the improved results obtained with GLS enzymes at low temperatures, it was at first thought necessary to locate a thermophylic GLS enzyme for use at higher bottom hole temperatures. One of the first isolations of thermophylic, or heat-loving, organisms occurred in the late 1960's, when organisms were found to be thriving in hot springs around the world. Recent studies have further isolated organisms which exist in natural environments exhibiting extreme temperatures and acidic or alkaline conditions.

As a result of the need for GLS specific enzymes which would be tolerant of temperatures up to 300 degrees F. or more, Applicants undertook several research efforts concerned with correlations establishing the relationship of elevated temperature and pressure on the catalytic activity and stability of biomolecules. Studies in enzyme literature had previously found that enzymes generated by a particular organism exhibited an enhanced catalytic activity and heat resistance when exposed to elevated pressures. See *Bacteria That Flourish Above 100 C. Could Benefit Industrial Processing,* Chemical and Engineering News, Nov. 4, 1991, 69:31–34. The reaction rate of the enzymes was observed to be increased 3-fold when the pressure was raised from 150 psi to 3700 psi. Additionally, the temperature stability of the enzyme was enhanced 5-fold when the pressure was increased to about 7500 psi. See also in this regard, *Enzymes From High-Temperature Microorganisms,* Current Opinion in Biotechnology, 1993, 4:188–192.

These observations provided the foundation for the development of extreme temperature stable enzymes to be utilized for polymer degradation in downhole applications. The guar linkage-specific enzyme complexes were extensively evaluated for their ability to degrade guar polymers in harsh environments typical of moderate to high-temperature fracturing applications. In evaluating the thermophylic organisms for use in well fracturing operations, Applicants made the surprising discovery that the same guar linkage-specific enzyme complex which was previously introduced was found to be equally effective at degrading the guar polymer in laboratory simulated high-temperature downhole environments due to the "pressure effect" which increases the temperature stability and catalytic activity of the enzyme system. The preferred enzymes are galactomannan hydrolases collectively called galactomannanase and they specifically hydrolyze the 1,6-α-D-galactomannosidic and the 1,4-β-D-mannosidic linkages between the monosaccharide units in the guar backbone respectively. The preferred galactomannanase is commercially available from Novo Nordisk of Norway as "Gammanase 1.5L." The preferred concentration of galactomannanase is a 1:2 (weight/weight [w/w]) solution of 1,6-α-D-galactosidase and mannan endo-1,4-β-D-mannosidase, the galactomannanase being present in the range from about 0.001 to 0.004% by weight, based on the total weight of aqueous fluid.

The pressure effect is illustrated in Table 1 which follows. The fluid was a commercially available CMHPG borate crosslinked base fluid commercially available from BJ Services Company, Houston, Tex. as "MEDALLION FRAC 4000 HT." The previously described enzyme breaker system provided in a 1:50 part aqueous mixture was added to the base fluid at various indicated concentrations. Viscosity was measured with time at various pressures. Note the dramatically lower 24 hour viscosities obtained at 4000 psi as compared to 20 psi.

TABLE 1

PRESSURE DESIGN TESTING
Temperature = 250° F.

| ENZYME CONCENTRATION | TIME | VISCOSITY AT 511 S-1 |
|---|---|---|
| PRESSURE: 20 PSI | | |
| 0 GPT | (0,8,24 hrs) | (425/198/157) |
| 3 GPT | (0,8,24 hrs) | (425/190/124) |
| 6 GPT | (0,8,24 hrs) | (425/143/94) |
| PRESSURE: 1000 PSI | | |
| 0 GPT | (0,8,24 hrs) | (425/194/149) |
| 3 GPT | (0,8,24 hrs) | (425/129/55) |
| 6 GPT | (0,8,24 hrs) | (425/63/21) |
| PRESSURE: 2000 PSI | | |
| 0 GPT | (0,8,24 hrs) | (425/160/142) |
| 3 GPT | (0,8,24 hrs) | (425/66/20) |
| 6 GPT | (0,8,24 hrs) | (425/55/12) |
| PRESSURE: 4000 PSI | | |
| 0 GPT | (0,8,24 hrs) | (425/147/120) |
| 3 GPT | (0,8,24 hrs) | (425/46/11) |
| 6 GPT | (0,8,24 hrs) | (425/38/7) |

Figure 1:
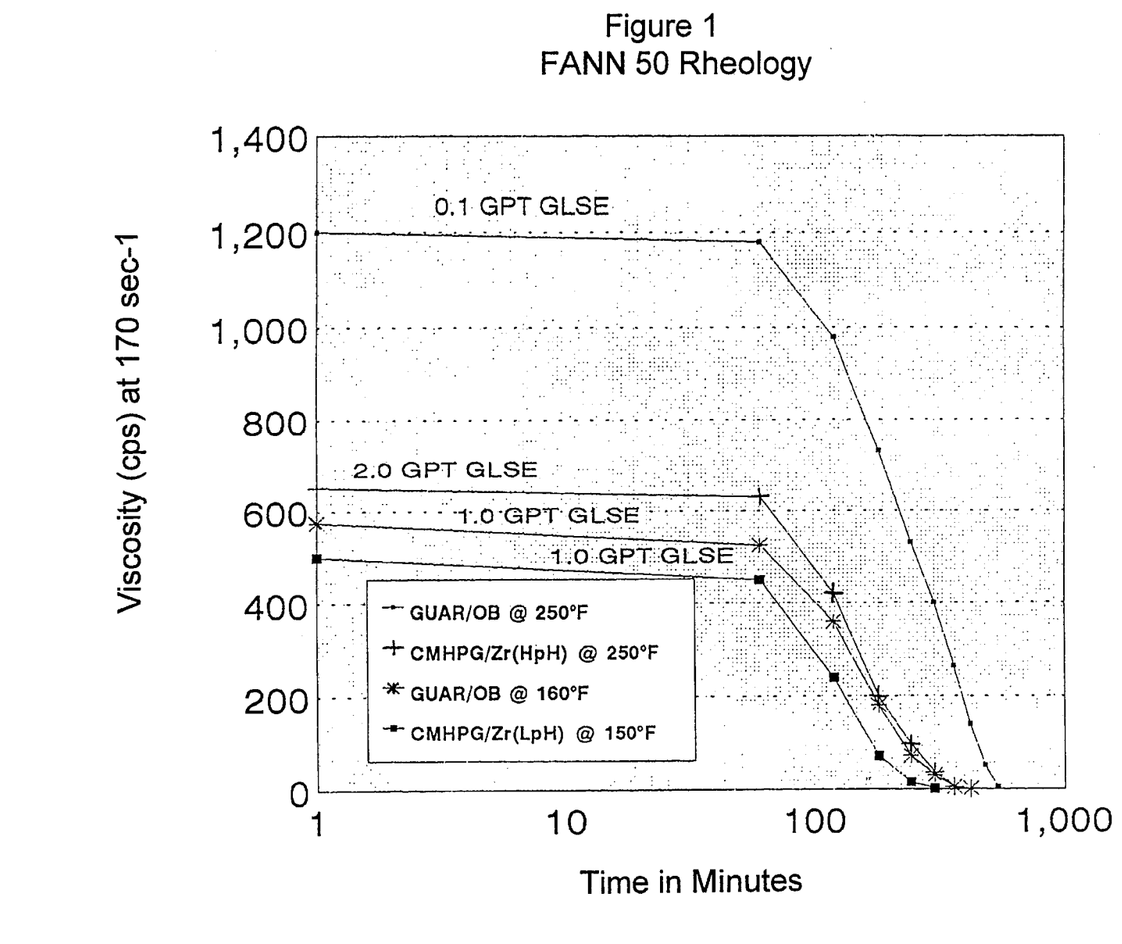
FIG. 1 is a graph of viscosity versus time for several fracturing fluids incorporating the enzyme breakers of the invention and at various temperatures.

Laboratory testing was also conducted to evaluate fluid rheology, proppant transport, static break time and, retained proppant-pack permeability on a variety of fluids. Rheological evaluations were conducted to observe the effect of the GLS enzyme breakers on fracturing fluid viscosity. The testing was conducted with automated Fann 50 C rheometers using modified-API testing procedures. The testing matrix included commercially available fluid systems at both high and low pH and temperatures from 150° F. to 250° F. The fluids tested were a Zr-crosslinked CMHPG at both pH 5 and pH 9 and, an organoborate-crosslinked guar at pH 10. A cross-section of the rheological performance data for the fluids are given in FIG. 1. Effective control of degradation rate was observed in each case as evidenced by the minimal viscosity loss in the first 60 minutes. Note also from FIG. 1, that although different lengths of time are required, each of the fluid systems were eventually reduced to near water viscosity.

Figure 2:
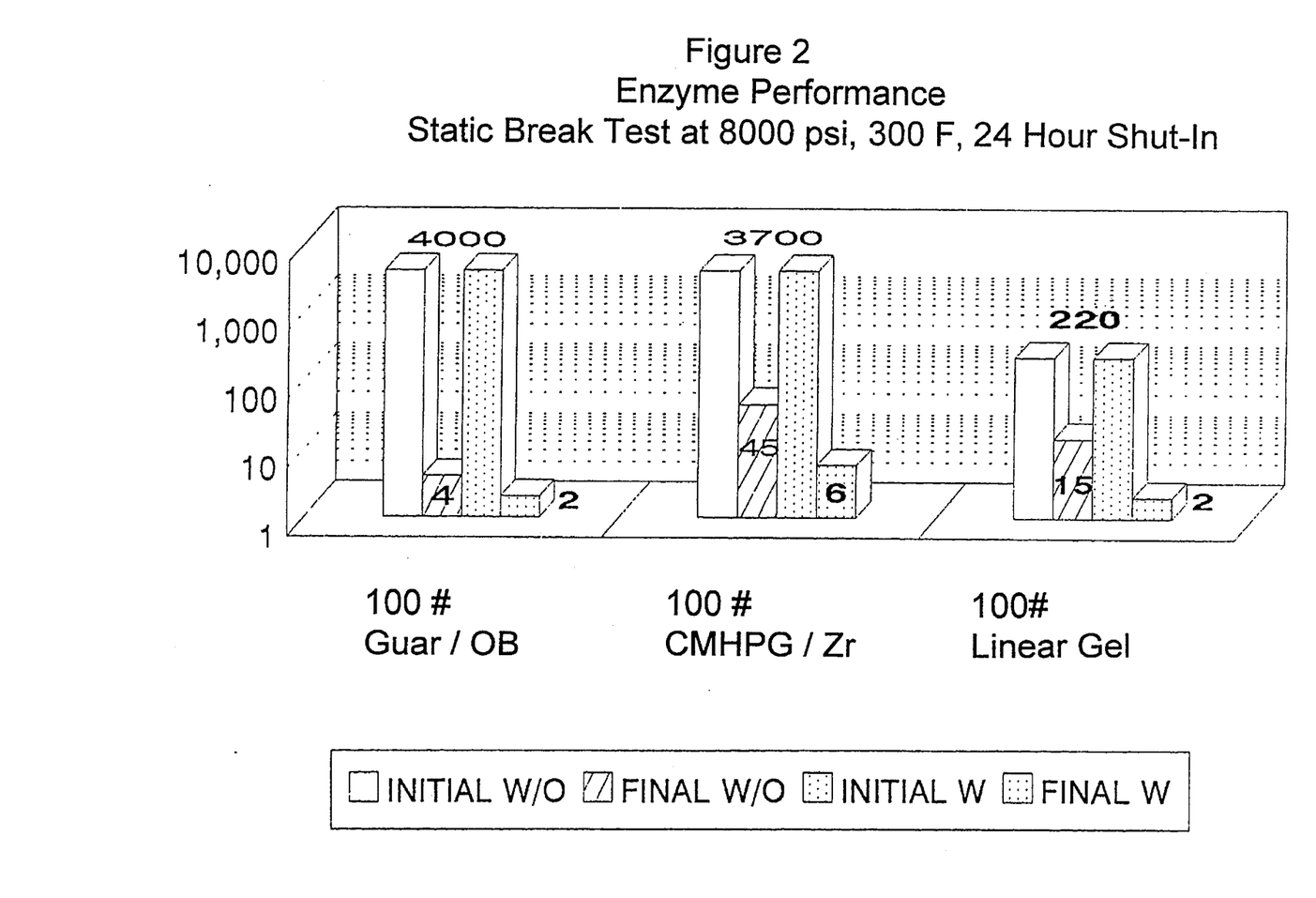
FIG. 2 is a graph showing the enzymatic activity of several fracturing fluids both with and without the enzyme breakers of the invention at 300° F. and 8000 psi.

Testing in Fann 50 C rheometers is limited to a maximum of 1000 psi. However, the hydrostatic pressures associated with high-temperature reservoirs are typically somewhat greater than 1000 psi. In order to evaluate the effects of high-temperature and high-pressure on the performance of the GLS enzymes, static break tests were conducted utilizing high temperature, high pressure testing equipment. Testing was conducted in pressurized cement curing chambers at 300° F. with 8000 psi for 24 hours. The fluids tested were 100 lbm/1000 gal, both with and without the GLS enzyme. The fluids tested were uncrosslinked guar at pH 7.8, Zr-crosslinked CMHPG at pH 9.0, and organoborate-crosslinked guar at pH 10.5. As shown in FIG. 2, the GLS enzyme effectively degraded each of the fluids. The 24-hour viscosity of the high pH Zr-crosslinked CMHPG, for example, was observed to be reduced from 45 cps with no breaker to 6 cps by the GLS enzyme.

Flow loop rheology, proppant transport, and retained proppant-pack permeability testing was performed by an independent laboratory to validate the GLS enzyme breaker performance. The procedures used were typical of those utilized for testing by the industry consortiums for fracturing fluid performance evaluations. The fluids tested were Zr-crosslinked CMHPG at both pH 5 and pH 9 and organoborate-crosslinked guar at pH 10. All phases of testing for each fluid/temperature combination used the same GLS enzyme breaker concentration. The proppant transport, as shown in Table 2, was reported to be from good to perfect in each evaluation in which the GLS enzyme was applied.

TABLE 2

| FRAC FLUID | GLS-E (GPT) | pH | TEMP | PSI | RETAINED PERM (%) | SETTLING RATE/30 MIN | SAND TRANSPORT |
|---|---|---|---|---|---|---|---|
| CMHPG/Zr | .1 | 4.6 | 100° F. | 500 | 86 | ≈0.39" | GOOD |
| CMHPG/Zr | 2 | 5.0 | 150° F. | 500 | 87 | <0.25" | VERY GOOD |
| CMHPG/Zr | 1 | 9.5 | 250° F. | 1000 | 70 | <0.25" | VERY GOOD |
| GUAR/MB | 1 | 9.7 | 100° F. | 500 | 94 | <0.25" | VERY GOOD |
| GUAR/OB | 1 | 9.7 | 100° F. | 500 | 97 | <0.25" | VERY GOOD |
| GUAR/OB | 2 | 9.8 | 160° F. | 500 | 94 | <0.25" | VERY GOOD |
| GUAR/OB | .25 | 10 | 250° F. | 1000 | 91 | <0.25" | VERY GOOD |

The retained proppant-pack permeability results are also summarized in Table 2. The data indicate that universally high and almost identical retained conductivities were achieved. The effects of polymer derivatization, crosslinker type, fluid pH, and temperature were essentially neutralized by the GLS enzyme breaker with respect to retained proppant pack permeability. The only real variable is the time necessary for the enzyme to affect complete degradation of the polymer.

Figure 3:
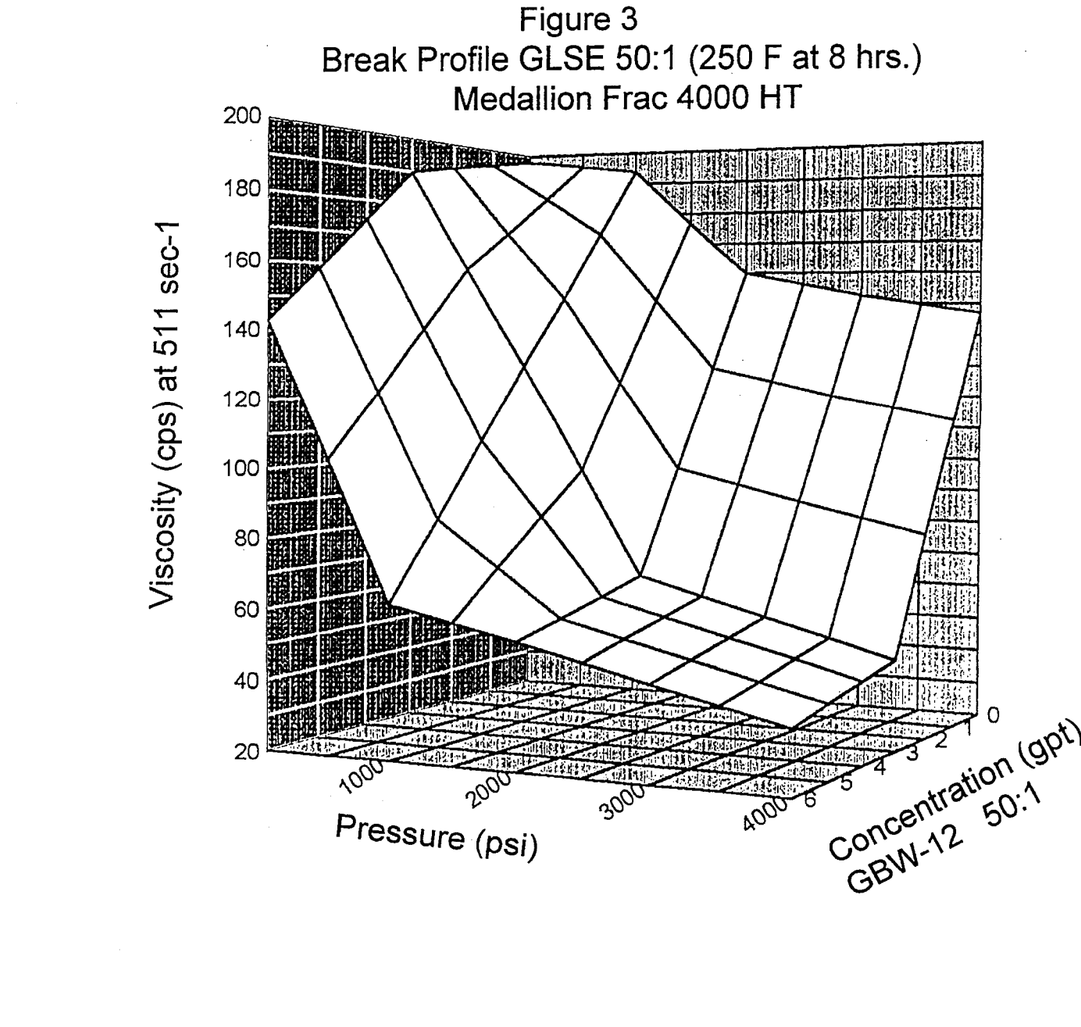
FIG. 3 is a mathematical model of fluid viscosity versus enzyme concentration at 8 hours elapsed time and 250° F. and with pressure shown as one variable.
Figure 4:
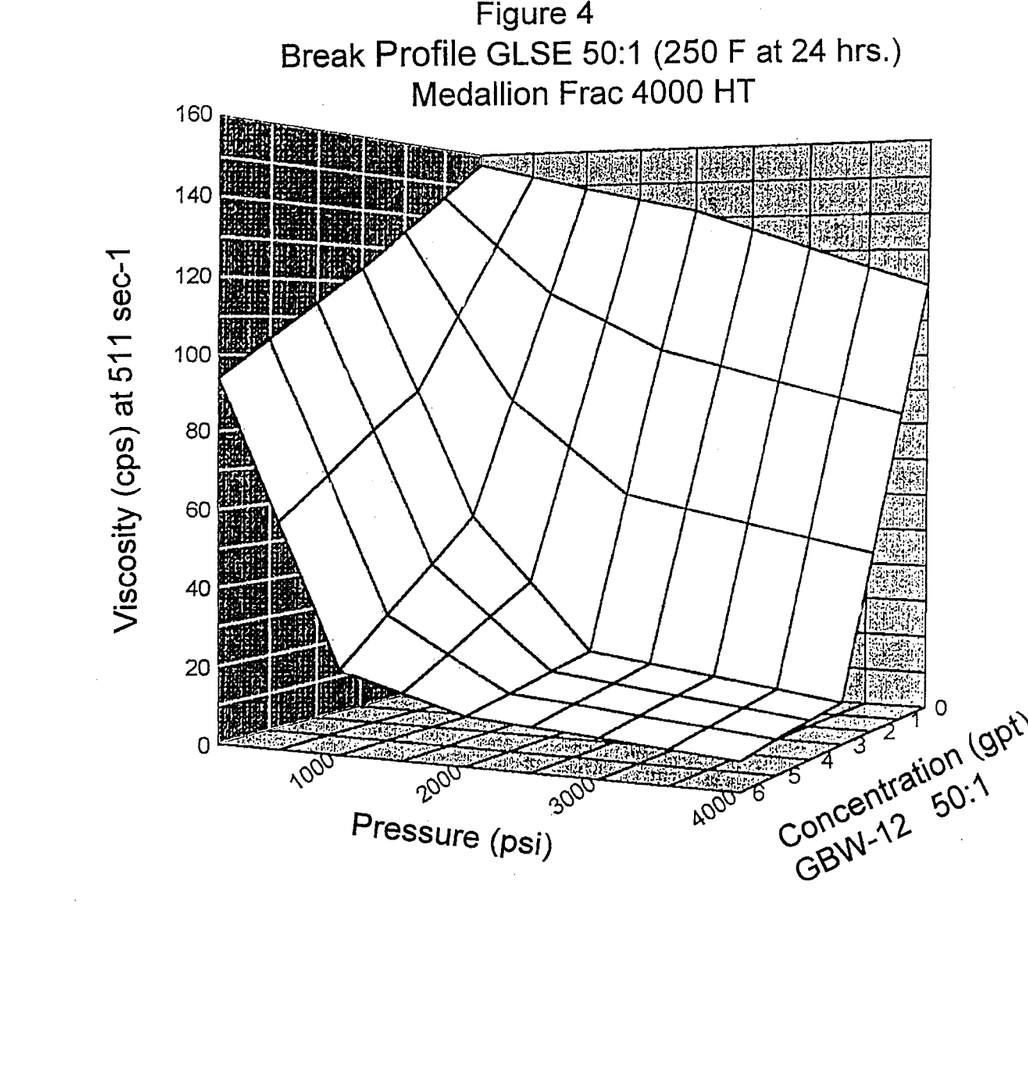
FIG. 4 is a mathematical model similar to FIG. 3 but at 24 hours time.

The realization of the pressure effect upon enzyme temperature stability and catalytic activity allows the mathematical modelling of a desired viscosity decrease in the base fluid at a given temperature and time and based upon the enzyme concentration selected. The concentration can, in fact, be used to determine the timing of the break, in effect, achieving a predetermined delayed break. The pressure under consideration here is the in-situ pressure acting upon the downhole fracturing fluid. The term "in-situ pressure" will be taken to mean the downhole reservoir pressure plus the existing hydrostatic pressure for purposes of the present invention and may be determined by conventional methods familiar to those skilled in the art. Typical break models are shown in FIGS. 3 and 4 for the same "MEDALLION FRAC 4000 HT" system previously described at 8 hours and 24 hours and 250° F., the model being developed from laboratory data.

The GLS enzyme breaker has been successfully applied in several high-temperature (>200° F.) fracturing applications. The enzyme has been successfully used in applications with BHST's as high as 300° F., with both low and high pH fluids, with both CMHPG and guar-based fluids, and with both Zr-crosslinked and organoborate-crosslinked fluids.

The invention has several advantages. The enzyme breakers of the invention remain active at higher temperatures and over wide pH ranges. In addition, the fracturing fluid and method of the invention allow a controlled reduction in viscosity of the fracturing fluid so that the gelled fluid breaks at the appropriate point in time after conclusion of the pumping operations. These breaks produce mostly monosaccharide fragments. Cleanup of the fluid is easier since the invention produces smaller fragments which are more soluble.

While the invention has been shown in only one of its forms, it is not thus limited but is susceptible to various changes and modifications without departing from the spirit thereof.

What is claimed is:

1. A method of fracturing a subterranean formation which surrounds a well bore, the method comprising the steps of:

formulating a gellable fracturing fluid by blending together an aqueous fluid, a hydratable polymer, a suitable crosslinking agent for crosslinking the hydratable polymer to form a polymer gel, and an enzyme breaker;

pumping the crosslinked polymer gel to a desired location within the well bore under sufficient pressure to fracture the surrounding subterranean formations;

allowing the enzyme breaker to degrade the crosslinked polymer, whereby the fluid can be pumped from the subterranean formation to the well surface;

wherein the enzyme breaker is a thermo-stable, polymer linkage specific enzyme which is catalytically active and temperature stable in the range from about 60 degrees F. to 300 degrees F. and at pH's between about 3.0 to 11.0.

2. The method of claim 1, wherein the polymer is selected from the group consisting of guar, derivitized guars, derivitized celluloses and water soluble biopolymers.

3. The method of claim 2, wherein the hydratable polymer is selected from the group consisting of guars and derivitized guars.

4. A method of fracturing a subterranean formation which surrounds a well bore, the method comprising the steps of:

formulating a gellable fracturing fluid by blending together an aqueous fluid, a hydratable guar polymer having repeating units of mannose and galactose linked by mannosidic and galactomannosidic linkages, a suitable crosslinking agent for crosslinking the hydratable polymer to form a polymer gel, and an enzyme breaker;

pumping the crosslinked polymer gel to a desired location within the well bore under sufficient pressure to fracture the surrounding subterranean formations;

allowing the enzyme breaker to degrade the crosslinked polymer, whereby the fluid can be pumped from the subterranean formation to the well surface;

wherein the enzyme breaker is a thermo-stable, guar linkage specific enzyme which is catalytically active and temperature stable in the range from about 60 degrees F. to about 300 degrees F. and at a pH range from 3 to 11.

5. The method of claim 4, wherein the guar polymer has repeating units of mannose and galactose linked by 1,4-β-D mannosidic and 1,6-α-D galactomannosidic linkages, and wherein the thermo-stable, guar linkage specific enzyme breaker consists essentially of purely or predominately β-1,4 linkage enzymes.

6. The method of claim 4, wherein the guar polymer has repeating units of mannose and galactose linked by 1,4-β-D mannosidic and 1,6-α-D galactomannosidic linkages, and wherein the thermo-stable, guar linkage specific enzyme breaker consists essentially of purely or predominately β-1,4 linkage and α-1,6 linkage enzymes.

7. A method of reducing the viscosity of a gellable fracturing fluid formulated to contain a proppant, a hydratable polymer, a suitable crosslinking agent for crosslinking the hydratable polymer to form a polymer gel and an enzyme breaker, the method comprising the steps of:

determining a minimum viscosity for the fracturing fluid necessary to maintain the proppant in suspension in the gelled fracturing fluid during an elapsed pumping time;

incorporating a predetermined amount of enzyme breaker into the fracturing fluid to attain a desired break viscosity at the end of the elapsed pumping time while maintaining the minimum viscosity to maintain the proppant in suspension in the fluid during pumping;

pumping the crosslinked polymer gel containing the enzyme breaker to a desired location within the well bore to form at least one fracture within a surrounding subterranean formation;

depositing the proppant and polymer in the fracture;

wherein the enzyme breaker is a thermo-stable polymer linkage specific enzyme which is catalytically active and temperature stable in the range from about 60 degrees F. to about 300 degrees F. and at a pH range from 3 to 11 and wherein the predetermined amount of enzyme breaker which is incorporated into the fracturing fluid is calculated from a mathematical model of viscosity versus concentration at a given time and temperature which includes formation pressure as one variable of the model.

8. The method of claim 7, wherein the predetermined amount of thermo-stable enzyme breaker which is included within the fluid is based upon a desired delay time for initiating the break.

* * * * *